United States Patent [19]
Whittaker et al.

[11] Patent Number: 5,573,220
[45] Date of Patent: Nov. 12, 1996

[54] ADJUSTABLE VIBRATION ABSORBING MACHINERY FOUNDATION MOUNT AND METHOD FOR TUNING THE SAME

[75] Inventors: Wayne H. Whittaker, Horton; Miles A. Shadley, Jackson; Richard A. Haase, Jackson; David L. Curtis, Jackson, all of Mich.

[73] Assignee: Unisorb Inc., Jackson, Mich.

[21] Appl. No.: 454,578

[22] Filed: May 30, 1995

[51] Int. Cl.⁶ ........................................................ F16M 3/00
[52] U.S. Cl. .................. 248/638; 52/126.6; 52/167.7; 248/615; 248/678
[58] Field of Search ................................. 248/638, 678, 248/679, 581, 592, 615, 188.4; 52/167.7, 167.8, 167.4, 126.6

[56] References Cited

U.S. PATENT DOCUMENTS 3,332,647  7/1967  Young ........................... 248/615 X
3,575,288  4/1971  Brucken ........................ 248/615 X
4,114,845  9/1978  Weisenberger ................. 248/615
5,110,082  5/1992  Rowan, Jr. .................... 248/678
5,238,215  8/1993  Jeker et al. .................. 248/581 X

OTHER PUBLICATIONS

"Master Catalog and Engineering Guide", Unisorb® Machinery Installation Systems, ©1992, The Felters Company, pp. 10–13.

Primary Examiner—Ramon O. Ramirez
Attorney, Agent, or Firm—Duncan F. Beaman

[57] ABSTRACT

A heavy duty vibration absorbing and leveling machinery foundation mount and a method for tuning the same, the mount consisting of a rigid horizontal platform having a plurality of vibration absorbing legs. A leveler is mounted in the central region of the platform having a vertically adjustable riser, and the legs are formed by pockets housing a composite vibration absorbing material extending below the platform and engaging the surface upon which the machinery mount is supported which may be tuned to most effectively absorb the vibration to which the mount is subjected.

13 Claims, 3 Drawing Sheets

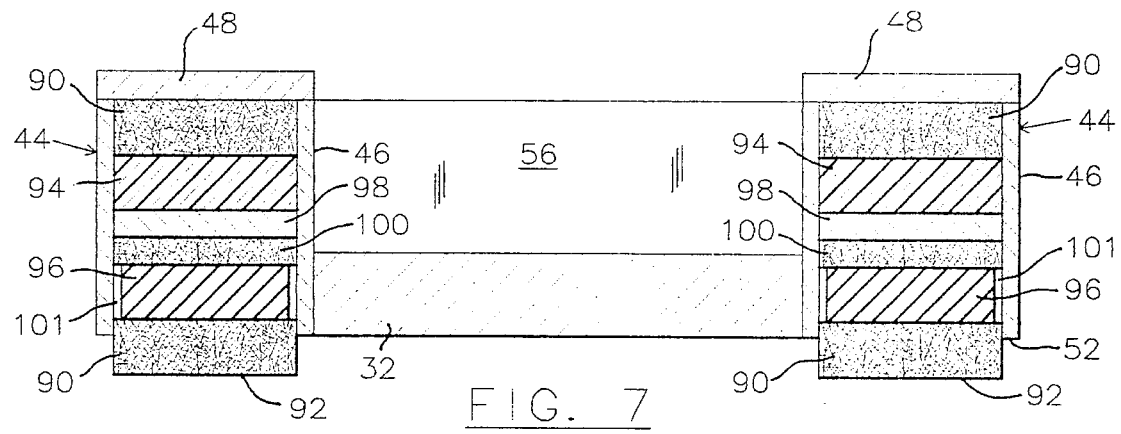
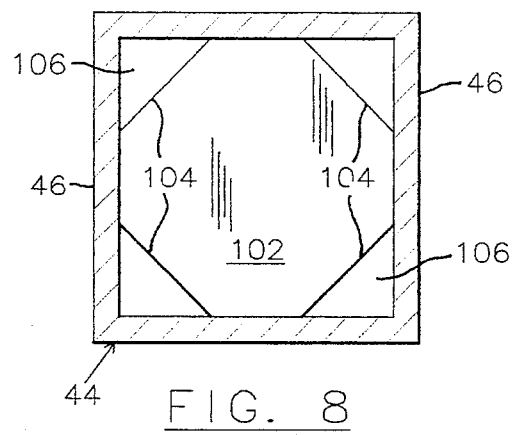
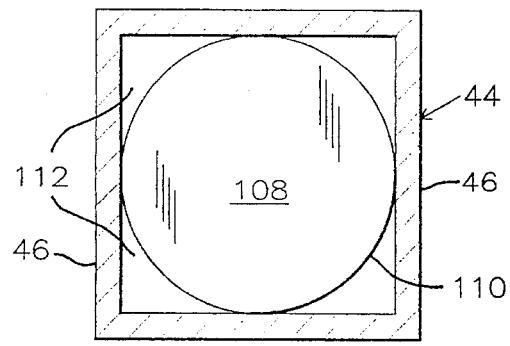
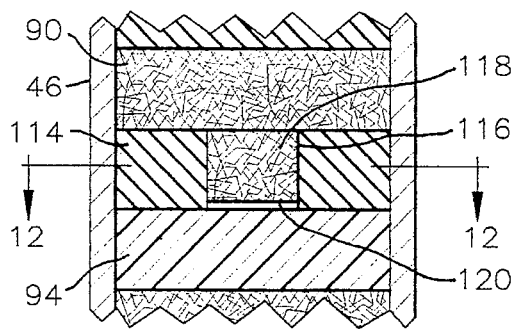
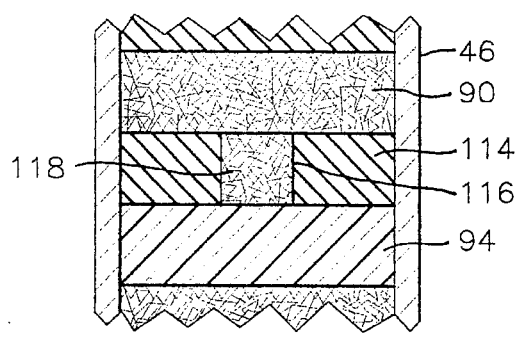
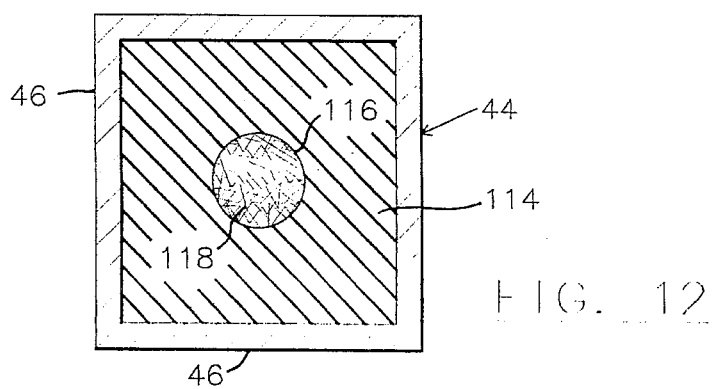

ADJUSTABLE VIBRATION ABSORBING MACHINERY FOUNDATION MOUNT AND METHOD FOR TUNING THE SAME

BACKGROUND OF THE INVENTION

1. Field of the Invention

The invention pertains to adjustable heavy duty vibration absorbing and damping mounts particularly used with foundations for heavy equipment wherein the mount is capable of uniformly distributing and damping large vertical and horizontal forces, and is vertically adjustable, and is capable of effectively absorbing vibrations.

2. Description of the Related Art

It is common to mount vibration producing equipment such as presses, machine tools, etc. on vibration absorbing supports whereby the vibrations generated by the equipment are not transmitted to the supporting surface, such as a floor. Such vibration absorbing supports reduce noise, reduce wear in the equipment being supported, reduce down time, improve efficiency, provide an improved work environment and protect the supporting surface from damage. Such vibration absorbing supports for equipment and apparatus may include pads formed of fabric, rubber or neoprene compounds or synthetic plastic materials capable of bearing high loads. Also, coil and air springs have been used to support equipment to absorb vibrations.

Very heavy dynamic equipment such as presses, large machine tools and large generators and turbines are often mounted upon concrete foundations which are, in turn, supported upon leveling and vibration absorbing anchors. The assignee, Unisorb Inc. of Jackson, Mich., produces a line of machinery installation systems for vibrating apparatus, and produces heavy duty vertically adjustable levelers or machinery mounts under the trademarks LEV-L-LINE® and FIXATOR® wherein vertical adjustment of machinery and machinery supporting foundations can be made, which is very important with respect to the installation of large machine tools, turbines and generators, where rotating shafts must be very accurately aligned.

However, in the past, a heavy duty support for machines or machinery foundations has not been available which is capable of both vertical adjustment and efficient vibration absorption, or wherein the vibration absorbing and damping characteristics can be readily changed and the present invention is directed to such apparatus.

OBJECTS OF THE INVENTION

It is an object of the invention to provide a heavy duty machinery foundation mount which is capable of bearing very heavy weight, and yet is vertically adjustable and will provide a system of neutral frequency low enough to provide vibration isolation for the mounted equipment over an extremely broad range.

Another object of the invention is to provide a heavy duty machinery foundation mount which is capable of absorbing vibrations and distributes the supported weight over a relatively large area, and is vertically adjustable.

A further object of the invention is to provide a machinery foundation mount which is capable of supporting very heavy weight, absorbing vibrations, is vertically adjustable, and is relatively economical to fabricate, and utilizes existing components.

An additional object of the invention is to provide a method for tuning the static deflection and internal damping characteristics of a machinery mount capable of supporting heavy weights wherein the vibration absorbing and damping characteristics may be varied by selectively utilizing a plurality of vibration absorbing and damping elements to achieve the desired static deflection.

Yet another object of the invention is to provide a method for adjusting the vibration absorbing and damping characteristics of a heavy duty machinery mount wherein the tuning thereof is accomplished by selectively utilizing a plurality of vibration absorbing and damping elements in a desired combination to achieve internal damping and static deflection, and permits the vibration absorbing and damping characteristics to be readily varied by changing the combination of elements located within a pocket defined upon the mount.

Another object of the invention is to provide a machinery foundation mount capable of supporting heavyweights and absorbing and damping vibrations over a broad range wherein the vibration and damping absorbing characteristics may be tuned and adjusted for the particular installation and where a large static deflection is produced in a compact machinery mount.

SUMMARY OF THE INVENTION

The basic component of a machinery foundation mount in accord with the invention is a fabricated substantially rigid platform upon which the vertically adjustable leveler is mounted. In the preferred embodiment, the platform consists of a generally rectangular plate of steel which is of sufficient thickness, such as one and one-half inches, to resist significant deformation even under exposure to high forces perpendicular to the plane of the platform plate.

At each of the corners of the rigid platform plate, a square tubular pocket is affixed, each having a vertical longitudinal axis, a closed upper end extending above the platform, and an open lower end adjacent the lower side of the platform plate.

The pockets are sufficiently spaced apart to provide a central region on the platform plate of adequate dimension whereby a heavy duty leveler may be mounted on the upper surface of the platform plate between the pockets having a vertically adjustable riser which extends above the pockets' closed ends.

Preferably, the leveler is of the inclined wedge type wherein a wedge mounted upon a base member slidably engages a riser having a complementary configured inclined surface wherein translation of the wedge by a threaded screw causes the riser to selectively elevate or lower. Such devices are presently manufactured by the assignee of the present application and sold under the trademark FIXATOR®.

The pockets at each corner of the platform plate contain a plurality of vibration absorbing elements in the form of pads capable of absorbing and damping vibrations of known frequencies. These pads are stacked upon each other, several pads being located within each pocket, and confined within the associated pocket.

The lowermost vibration absorbing pad located in each pocket has an upper portion confined within the associated pocket, and the lower portion thereof extends below the pocket lower open end and platform plate lower side for direct engagement with the machinery mount supporting surface. Accordingly, all of the weight imposed upon the machinery mount through the leveler is transferred to the vibration absorbing pads located within the pockets and the pads will absorb and damp vibrations imposed upon the machinery mount.

The support of the leveler upon the platform plate intermediate the pockets permits a degree of vertical adjustment of the mount as determined by the leveler operating limits, and the combination of the leveler as mounted upon the platform plate which, in turn, is supported upon the vibration dampening pads provides a machinery foundation mount capable of bearing very high weights, and yet is able to be vertically adjusted and also absorbs vibrations.

As the platform plate and pockets are preferably formed from steel plate, and are fabricated by welding, the platform for the leveler is economically produced, and the entire assembly may be manufactured at reasonable cost by the utilization of the presently available leveler structure.

The vibration absorbing and damping characteristics of the machinery mount are determined by the composition and vibration and damping characteristics of the pads located within the platform pockets. The pads within each pocket might all be formed of identical material if such material achieves the desired range of vibration absorbing and damping. However, by using elements of different vibration absorbing and damping characteristics within a common pocket, it is possible to "customize" the static deflection capabilities of the stack of pads and provide a "mix" of pads which produces the ultimate frequency isolation characteristics. If machinery mounts in accord with the invention are installed and it is determined that the desired frequency absorption and damping is not being achieved, the characteristics of the mount may be readily changed by varying the "mix" of pads in a pocket and the mount of the invention is capable of easily being revised with respect to its vibration absorbing and damping abilities if it is necessary to use field adjustments to achieve optimum results.

The vibration absorbing and damping characteristics of the individual elements or pads will vary according to the composition thereof, their size and thickness, the manner that they fit within the platform pockets, and the presence or absence of adjacent voids capable to accommodate pad expansion. Pads used in the practice of the invention may be formed of special fabrics, reinforced neoprene such as sold by the assignee under the trademark TITAN, neoprene or rubber reinforced with polyester materials, urethane, woven steel filaments, woven steel strands, and other materials which are known in the vibration absorbing and damping arts. Also, the use of low friction film between adjacent pads will vary the horizontal vibration absorbing and damping characteristics of the mount, and it is also possible to use pads having a primary material encompassing a secondary compressible material wherein the vibration absorbing and damping characteristics will vary in accord with the compressive force imposed upon the pad stack.

BRIEF DESCRIPTION OF THE DRAWINGS

The aforementioned objects and advantages of the invention will be appreciated from the following description and accompanying drawings wherein:

FIG. 7 is an elevational sectional view similar to that of FIG. 6 illustrating a variety of pads formed of different compositions shown in the frame pockets, FIG. 8 is a plan sectional view taken through a frame pocket between adjacent pads illustrating a octagonal configuration pad and its relationship to the pocket, FIG. 9 is a plan sectional view similar to FIG. 8 illustrating the relationship of a circular configuration pad and its associated frame pocket, FIG. 10 is a detail enlarged elevational sectional view taken through the frame pocket illustrating a two material pad in its uncompressed form, FIG. 11 is a view similar to FIG. 10 illustrating the two material pad under compression, and FIG. 12 is a plan sectional view taken along Section 12—12 of FIG. 10.

DESCRIPTION OF THE PREFERRED EMBODIMENT

Figure 1:
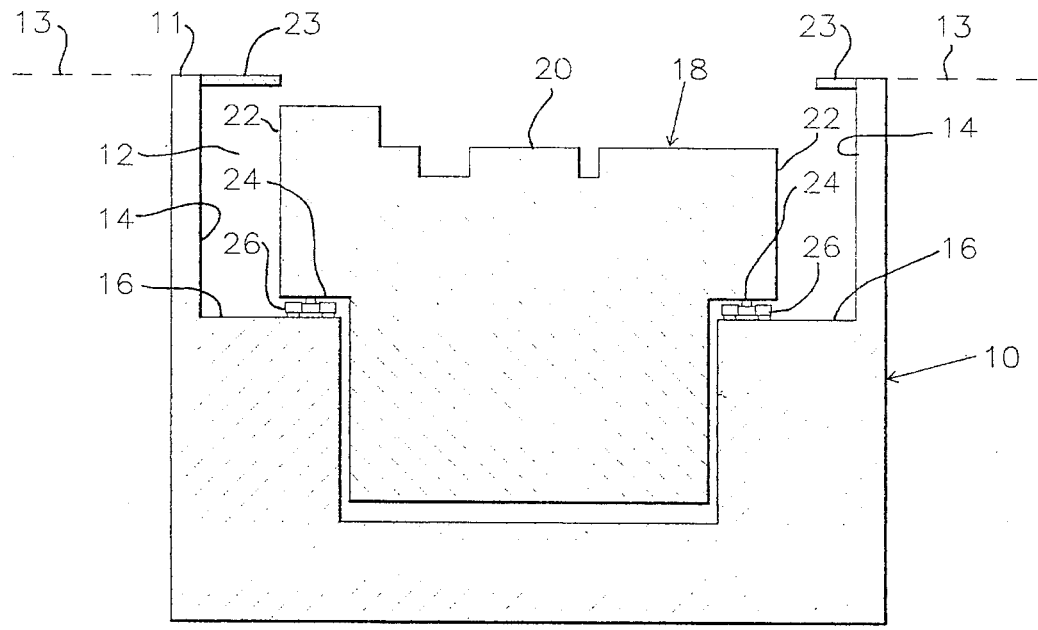
FIG. 1 is an elevational sectional view showing a typical installation utilizing the machinery foundation mount of the invention wherein the mount is interposed between a machinery foundation and the primary support structure.

While the vibration absorbing machinery mount of the invention may be used in any heavy duty application whereby vibration absorbing and vertical adjustment for leveling purposes is desired, the invention is particularly suitable for supporting concrete isolated inertia block foundations as used with large machine tools, turbines, generators, compressors and the like wherein the support of the machine is critical. Also, concrete foundations are employed with machines which are not support-critical, but which are exposed to high amplitude and low frequency vibrations. In FIG. 1, a typical installation utilizing the mount of the invention with a foundation is illustrated.

In FIG. 1, the primary support for a foundation is represented at 10. The primary support 10 comprises a concrete mass which has been poured within a pit or hole dug in the floor of the shop or machinery enclosure. The primary support top edge 11 will be in alignment with the floor surface of the shop or machinery enclosure as represented at 13.

A formed cavity 12 is located within the primary support 10 and includes vertical walls 14 and horizontal surfaces 16, and the cavity 12 may include a portion extending below the surfaces 16 to add mass to the machinery foundation.

The machinery foundation is represented at 18 and is also formed of concrete and is usually poured in place within the cavity 12, but may be formed elsewhere and then placed into the cavity. The foundation 18 includes an upper surface 20 which may be configured as shown to accommodate the particular machinery to be supported, not shown. The foundation 18 includes vertical surfaces or walls 22 in spaced horizontal relationship to the primary support vertical walls 14, and the foundation also includes horizontal surfaces 24 in parallel opposed relationship to the primary support horizontal surfaces 16. Removable walk plates 23 may be mounted upon the support 10 in alignment with floor 13 extending toward the foundation 18 to enclose the cavity 12.

The vertically adjustable vibration absorbing foundation mount 26 constituting the subject matter of the instant invention is located between the primary support horizontal surfaces 16 and the opposed machinery foundation horizontal surfaces 24, as will be appreciated from FIG. 1. A plurality of mounts 26 are used to support the foundation 18 longitudinally spaced along the length of the foundation as necessary to accommodate the weight of the foundation and the machinery mounted thereon. As will be appreciated from FIG. 1, the entire mass of the foundation 18 is supported upon the mounts 26, and sufficient spacing exists within the cavity 12 to prevent vibrations within the foundation 18 from directly passing to the primary support 10. The entire weight of the foundation 18 is borne by the mounts 26.

The construction of the foundation mount 26 will be appreciated from FIGS. 2–6. Primarily, the mount 26 comprises a fabricated, substantially rigid, steel frame 28 having a vertically adjustable leveler 30 mounted thereon.

The primary component of the frame 28 is the thick flat platform plate 32 which is formed of a steel plate and is of sufficient thickness to achieve a high degree of rigidity. The platform plate 32 is of a generally rectangular overall configuration as will appreciated from FIG. 4, and includes a flat upper surface 34, and a flat lower surface 36. The end edges of the platform plate are defined at 38 and the side edges 40 are perpendicular to the end edges 38.

Figure 4:
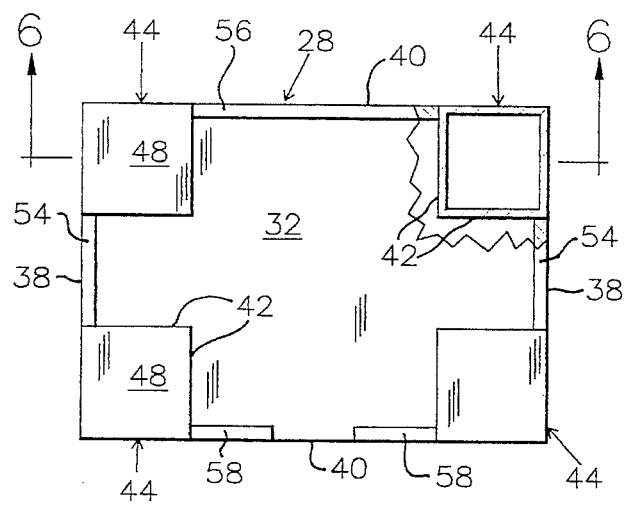
FIG. 4 is a top plan view of the mount frame, per se, partially in section.
Figure 5:
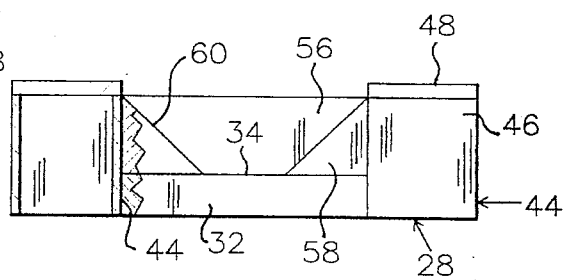
FIG. 5 is an end elevational view of the frame, per se, as taken from the lower side of FIG. 4, partially in section.

The corners of the platform plate 32 are each cut out at 42, FIG. 4, to define a right angle notch within each corner. Within the notched cutouts 42, a pocket 44 is located at each platform plate corner defining the legs for the platform plate.

The pockets 44 are preferably formed of square steel box tubing having sides 46 which are welded to the upper and lower surfaces of the platform plate 32 at the corner cutouts 42. The upper end of each pocket 44 is closed by a steel top plate 48 welded to the associated pocket sides 46. The lower edge of each pocket 44 is represented at 50, and the pocket lower edges 50 are in substantial alignment with the platform plate lower surface 36 as will be appreciated from FIG. 6. The lower edges 50 define a square open end 52 in each of the pockets 44.

Rectangular end plates 54 are located between adjacent pockets 44 and are welded to the pocket sides 46 and the platform plate upper surface 34 to reinforce the pockets and contribute to the rigidity of the frame 28. Likewise, a flat steel rear plate 56 extends along one of the platform plate side edges 40 and is welded to the adjacent pocket sides 46 and the upper surface 34 of the platform plate 32.

A pair of front reinforcing plates 58 are located adjacent the other platform plate side edge 40 and are welded thereto and to the associated pocket sides. Each of the plates 58 includes an inclined surface 60 which provides access to the leveler adjustment screw as will be later apparent.

It will be appreciated that the frame 28, as formed of a plurality of steel plate weldments and rectangular tubing, as welded to the thick platform plate 32 produces a highly rigid assembly capable of resisting significant deformation from forces imposed at right angles to the plane of the platform plate 32.

Figure 2:
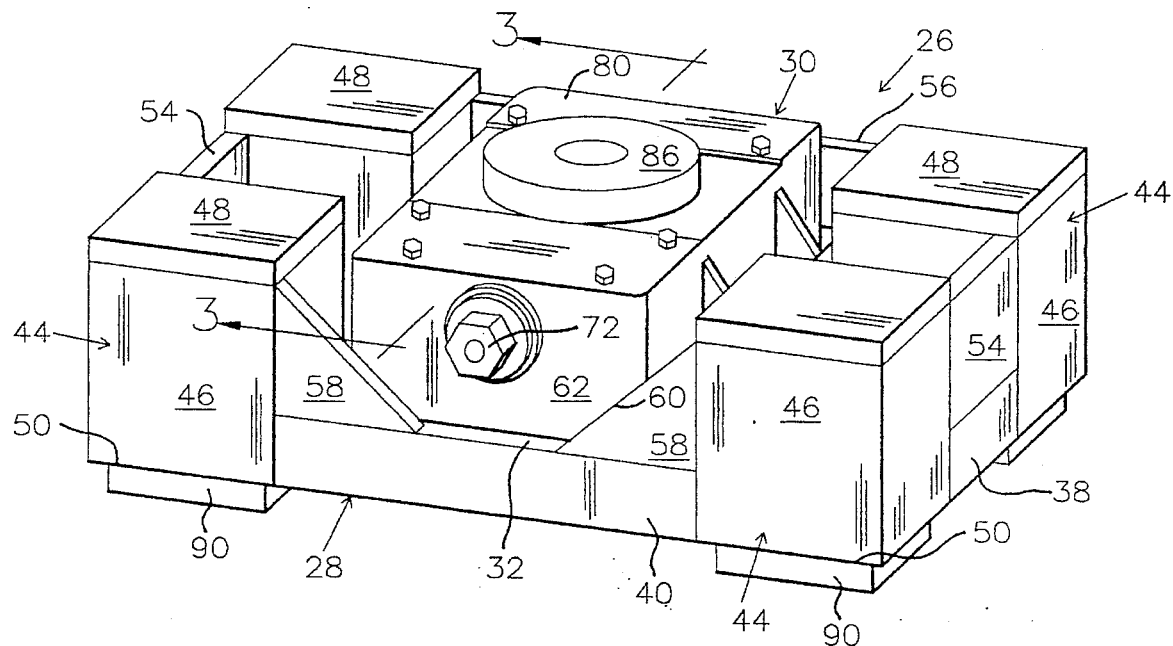
FIG. 2 is a perspective view of a fully assembled machinery mount in accord with the invention.
Figure 3:
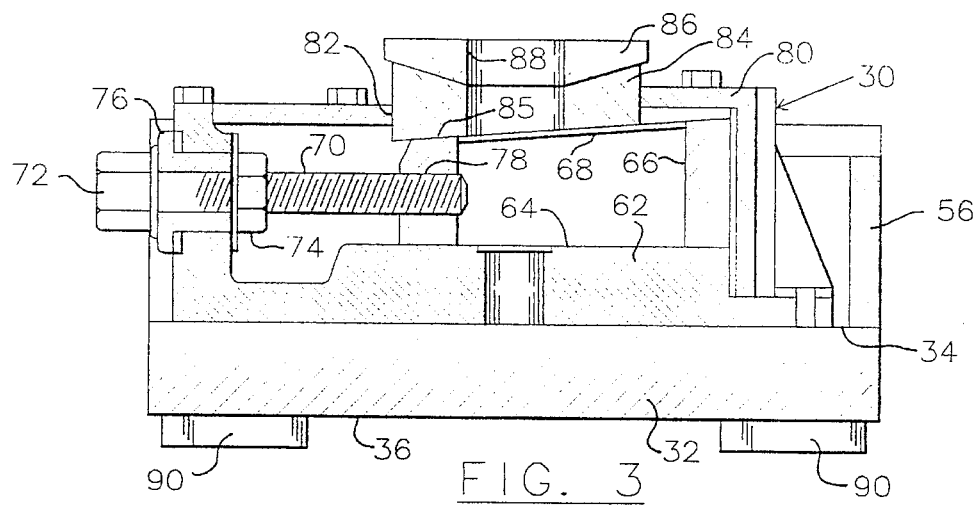
FIG. 3 is an elevational sectional view as taken along Section 3—3 of FIG. 2.

The vertically adjustable leveler 30 is located upon the upper surface 34 of the platform plate 32 in the central region of the platform plate intermediate the pockets 44 as will be appreciated from FIG. 2. The leveler 30 includes a base 62, FIG. 3, which is fixed to the central region of the platform plate 32 by adhesives or bolts. The base 62 includes a top flat surface 64 upon which the wedge 66 is movably supported. The upper surface of the wedge 66 is inclined with respect to the base surface 64 and constitutes an inclined wedge cam surface 68. Displacement of the wedge 66 upon the base 62 is achieved by the threaded screw 70 having an operating hexagonal head 72 rotatably mounted upon an upstanding portion of the base 62, and the screw 70 is retained against axial displacement by the retainer nut 74 threaded upon the screw 70 associated with the shoulder retainer bushing 76 surrounding the screw. The screw 70 is threaded into the threaded bore 78 defined in the wedge 66, and upon applying a wrench to the head 72 to rotate the screw 70, the wedge 66 may be moved in either horizontal direction parallel to screw 70 across the base surface 64.

A cover bearing block 80 is bolted upon the base 62 having an opening 82 in which the riser 84 is received. The lower surface of the riser 84 is obliquely related to the base surface 64 on a complemental angle with respect to the wedge cam surface 68 and engages the cam surface 68. A self-alignment plate 86 is mounted upon the upper surface of the riser 84 upon complementary curved surfaces defined on the riser and alignment plate whereby the alignment plate will automatically adjust itself to the foundation surface or other member being supported, not shown.

The leveler 30 described above is a commercial item available through the assignee, Unisorb Inc., sold under the trademark FIXATOR®, and Model Nos. RK IV or RK V, the heavier duty models of the FIXATOR® are usually used with the machinery foundation mount of the invention, and the dimensions of the machinery mount frame 28 are such as to accommodate the appropriate leveler unit.

Figure 6:
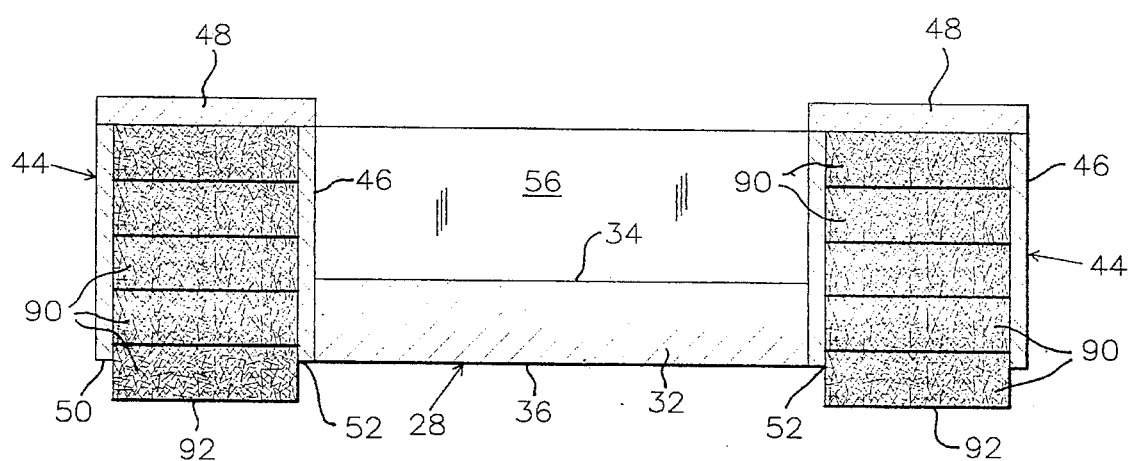
FIG. 6 is an elevational sectional view as taken along Section 6—6 of FIG. 4 illustrating the vibration absorbing pads within the frame pockets.

The vibration absorbing and damping capability of the mount 26 is achieved by the vibration insulation pads located within the pockets 44 as will be appreciated from FIG. 6. Preferably, a plurality of vibration absorbing pads 90 are stacked within each pocket 44 and the lower surface 92 of the lowermost pad engages the supporting surface for the mount. As will be appreciated from FIG. 6, the lowermost pad 90 extends well below the platform plate lower surface 36 and the associated pocket lower edge 50, but the upper portion of the lowermost pad 90 is still located and confined within the associated pocket 44 and is prevented from lateral displacement relative to the associated pocket and superimposed pads 90. As the pocket top plates 48 prevent vertical movement of the stack of vibration isolation pads 90, the vertical forces imposed upon the frame 28 are transferred to the pads 90 by the top plates 48 and the pads 90 will be placed under compression.

The vibration isolation pads 90 are formed of a material capable of absorbing vibration, and in FIG. 6 the pads 90 are all formed of the same material such as a polyester duck fabric laminated with an oil-resistant neoprene compound. Such textile based pads have excellent vibration absorbing characteristics under high compressive forces, and are available through the assignee, Unisorb Inc., sold under the trademark TITAN™.

As appreciated from FIG. 1, the foundation supporting mounts 26 are located between the primary support surfaces 16 and the foundation horizontal surfaces 24. As the riser alignment plate 86 extends above the pocket's top plates 48, the foundation horizontal surface 24 will be engaged by the alignment plate 86, and the foundation 18 may be selectively raised and lowered by rotation of the screw 70 through head 72 as desired to achieve an equalizing of the weight on each of the mounts 26 to produce the desired leveling and vibration absorbing support of the foundation 18. Of course, a plurality of mounts 26 will be spaced along each side of the foundation 18 throughout its length permitting the foundation to be very accurately adjusted and aligned. As will be appreciated from FIG. 1, sufficient spacing exists between the cavity walls 14 and the foundation walls 22 to permit workmen access to the mounts 26 to achieve final adjustment of the vertical position of the plates 86.

By placing the leveler 30 upon the rigid frame 28, and supporting the frame 28 in a vibration absorbing manner by the pads 90, a very rigid and accurate support for the leveler 30 is achieved wherein vibrations imposed upon the leveler 30 through the foundation 18 will be absorbed. The fact that vibration absorbing pads 90 are located at four spaced locations on the frame 28 permits the compressive forces transmitted through each pocket 44 to be spread over a relatively large area to maintain the compressive force imposed on the pads 90 within their operating capabilities, and the welded fabrication of the frame 28 permits a relatively economical vibration absorbing vertically adjustable foundation mount to be produced utilizing available components.

A significant aspect of the invention is the ability of the machinery mount to produce a large static deflection within a compact construction, and the ability of the machinery mount to have its static deflection and internal damping to be easily customized whereby optimum vibration isolation is achieved for the particular installation in which the mount is used. This "fine tuning" of the vibration absorbing and damping characteristics of the machinery mount is achieved by utilizing vibration absorbing and damping elements within the pockets 44 which most effectively absorb and damp the vibrations to which the mount is subjected.

In the description of the embodiment of FIG. 6, the vibration absorbing and damping elements or pads 90 are all formed of the same material and have the same vertical and horizontal dimensions, and are closely received within the associated pocket 44. Such a composition of the vibration absorbing and damping materials within the pockets wherein the same composition of each pad exists may achieve the desired results, but experience has shown that in many installations, the pads within the pockets may have to be formed of different materials in order to customize and tune the machinery mount vibration absorbing and damping characteristics to the particular installation to achieve the most efficient results. An example of a tuned stack of vibration absorbing and damping elements of various compositions are shown in FIG. 7.

Of course, regardless of the composition of the pads within the pockets 44, the configuration of the mount frame 28 remains unchanged, but the types of pads located within the pockets 44 differs from the composition of the identical pad stacks shown in FIG. 6.

In FIG. 7, reinforced fabric and neoprene pads 90 similar to those previously described are utilized within each pocket 44. Further, a pad 94 is shown within each pocket stack formed of a synthetic rubber like or plastic material such as neoprene, or urethane. A rubber vibration absorbing and damping pad is illustrated at 96, and the pads 98 may be formed by a woven steel or steel strand construction.

The vibration absorbing and damping characteristics of an element or pad can further be modified, in addition to using different compositions, by varying the vertical thickness of the pad, as represented at 100 where a thinner fabric type pad is employed than as shown at 90. Also, it is possible to change the absorbing and damping characteristics by leaving a circumferential void 101 between the vertical sides of a pad and the pocket sides 46 whereby the pad is capable of horizontal expansion and is not as closely confined by the pocket sides as a pad which is closely fitted within the pockets.

In the illustration of FIG. 7, four different pad compositions are illustrated, which is probably a greater number of different compositions that would normally be necessary to achieve the desired tuning. However, it is to be understood that by varying the composition of the pads, their "fit" within the pockets, and by varying the vertical and horizontal dimensions of the pads, the vibration absorbing and damping characteristics can be varied with respect to that achieved by the entire stack. The composition and placing of the various pads within each of the four pockets will usually be identical so that the vibration absorbing and damping characteristics of the stack within each pocket of the mount will be identical.

FIG. 8 illustrates a variation in the pad configuration which will also vary the vibration absorbing and damping characteristics of a pad regardless of its composition. In FIG. 8, a pad 102 is illustrated having an octagon configuration where four of the sides engage the pocket sides 46, and the four sides 104 define a void 106 between the pad and the pocket whereby horizontal expansion is possible as the stack is compressed, and the ability of the pad 102 to horizontally expand will vary its vibration absorbing and damping characteristics.

A variation of pad configuration with respect to that shown in FIG. 8 is shown in FIG. 9 wherein a circular pad 108 is illustrated having a periphery 110 which defines voids 112 permitting horizontal expansion of the pad 108 under compression.

In FIGS. 10–12, another type of pad is illustrated which may be included within a pocket stack and wherein the vibration absorbing and damping characteristics thereof vary in accordance with the compressive forces imposed upon the pad and stack.

With reference to FIG. 10, a pad 114 may be formed of rubber or other expandable material having a central hole 116 formed therein. The hole 116 is partially filled with a compressible material, such as reinforced fabric 118, cork, or similar compressible composition. The vertical height of the material 118 is less than the vertical height of the rubber pad 114 whereby a void 120 exists under the material 118 as shown in FIG. 10.

Under compression, as shown in FIG. 11, the material of pad 114 will compress the material 118 and permit the rubber material 114 to decrease in its vertical dimension. This compression eliminates the void 120, reduces the diameter of the hole 116, and changes the vibration absorbing and damping characteristics of the pad 114 in accordance with the forces imposed upon the stack in which the pad 114 is incorporated.

It is also possible to vary the ability of the elements within a pocket 44 to absorb and damp horizontal forces by interposing a low friction film of material, such as sold under the trademark TEFLON® between one or more engaging pads.

When installing a plurality of mounts 26 to support a machinery foundation, or a machine, it is usually possible to calculate with some degree of accuracy the range of vibrations to which the mount will be subjected. Accordingly, the composition of vibration absorbing and damping pads which will be originally assembled within each mount pocket 44 will be so chosen and configured to effectively absorb and damp the calculated vibrations. However, if because of soil conditions, variations in concrete density, or other unforeseen and uncalculatable reasons, the initial choice of pads used in the pockets 44 does not as effectively absorb the vibrations over the range to which the mount is subjected the vibration absorbing and damping characteristics of the mounts can be easily modified by changing the composition of the pads, or their shape and fit within the pockets. The construction of the mount of the invention permits easy customizing of the mounts to a particular installation and significantly reduces time and cost to achieve optimum vibration absorption and damping in large installations.

It is appreciated that various modifications to the inventive concepts may be apparent to those skilled in the art without departing from the spirit and scope of the invention.

We claim:

1. An adjustable heavy duty vibration absorbing machinery mount comprising, in combination, a substantially rigid platform having an upper surface and a lower surface, said platform being of a rectangular configuration having four corners, a vibration absorbing leg mounted upon said platform at each corner extending below said lower surface for engagement with a supporting surface, each of said legs comprising a vertically extending pocket having an upper closed end, a lower open end, a vibration absorbing material within said pocket extending below and from the associated pocket lower open end, a leveler having a base mounted upon said platform upper surface, a riser mounted on said base for vertical adjustment thereon, and a riser operator mounted upon said base selectively vertically adjusting said riser with respect to said base.

2. In an adjustable heavy duty vibration absorbing machinery mount as in claim 1, said vibration absorbing material comprising a fabric composition.

3. In an adjustable heavy duty vibration absorbing machinery mount as in claim 1, said vibration absorbing material comprising a plurality of stacked pads located within each pocket, the uppermost pad of each stack engaging the associated pocket closed end and the lowermost pad of each stack being partially located within the associated pocket adjacent the lower open end thereof and partially extending below and from the open end thereof.

4. The method of adjusting the vibration absorbing characteristics of a heavy duty machinery mount including a platform having a leveler mounted thereon and a pocket having a substantially closed upper end, vertically extending sides, and an open lower end comprising the steps of:

a) choosing a plurality of substantially planar pads formed of vibration absorbing material capable of together substantially absorbing the vibrations to which the platform will be subjected, and b) stacking said pads within the platform pocket in vertical superimposed relationship forming a stack wherein the planes of said pads are substantially horizontal, the lowermost pad partially extending from the pocket open end and vertical forces within the stack of pads are applied to the platform through the pocket closed upper end.

5. The method of adjusting the vibration absorbing characteristics of a heavy duty machinery mount as in claim 4 wherein at least one of said pads of vibration absorbing material within said stack has different frequency absorbing capabilities than other of said pads.

6. The method of adjusting the vibration absorbing characteristics of a heavy duty machinery mount as in claim 4, wherein a spacing exists between at least a portion of the horizontal periphery of at least one of said pads and the sides of the pocket whereby said pad is capable of horizontal expansion under vertical compression.

7. The method of adjusting the vibration absorbing characteristics of a heavy duty machinery mount as in claim 4, a plurality of pockets defined on the platform each having a substantially closed upper end, vertically extending sides, and an open lower end, a stack of vibration absorbing material pads within each pocket, the vibration absorbing character of each stack of pads within each pocket being identical.

8. An adjustable heavy duty vibration absorbing machinery mount comprising, in combination, a substantially rigid plate having an upper surface, a lower surface, a central region and a periphery, a plurality of spaced vibration absorbing legs defined on said plate at said plate periphery extending below said plate lower surface for engagement with a supporting surface, and a vertically adjustable load support mounted upon said plate upper surface at said plate central region for engaging a load located above the mount, each of said legs comprising a vertically extending pocket having an upper closed end and a lower open end, and a vibration absorbing material within said pocket extending below and from the associated pocket lower open end.

9. In an adjustable heavy duty vibration absorbing machinery mount as in claim 8, said vibration absorbing material comprising a fabric composition.

10. In an adjustable heavy duty vibration absorbing machinery mount as in claim 8, said vibration absorbing material comprising a plurality of stacked pads located within each pocket, the uppermost pad of each stack engaging the associated pocket closed end and the lowermost pad of each stack being partially located within the associated pocket adjacent the lower open end thereof and partially extending below and from the open end thereof.

11. In an adjustable heavy duty vibration absorbing machinery mount as in claim 10, wherein said plate is of a rectangular configuration having four corners, a vertically extending pocket being mounted on said plate at each corner.

12. In an adjustable heavy duty vibration absorbing machinery mount as in claim 10, wherein at least two of said pads in a common stack of pads have different vibration absorbing characteristics.

13. In an adjustable heavy duty vibration absorbing machinery mount as in claim 12, wherein at least two of said pads in a common stack of pads are formed of different materials.

* * * * *